US008092037B2

(12) United States Patent
Kassay et al.

(10) Patent No.: US 8,092,037 B2
(45) Date of Patent: Jan. 10, 2012

(54) FLUORESCENT LIGHT FIXTURE RETROFIT KIT

(75) Inventors: Charles E. Kassay, Smithtown, NY (US); Suzanne M. Pane, Yaphank, NY (US); Marc A. Kassay, Wake Forest, NC (US); John P. Kassay, Wake Forest, NC (US)

(73) Assignee: Philips Electronics North America Corporation, Burlington, MA (US)

( * ) Notice: Subject to any disclaimer, the term of this patent is extended or adjusted under 35 U.S.C. 154(b) by 388 days.

(21) Appl. No.: 12/460,902

(22) Filed: Jul. 24, 2009

(65) Prior Publication Data
US 2010/0046214 A1    Feb. 25, 2010

Related U.S. Application Data

(63) Continuation-in-part of application No. 12/229,390, filed on Aug. 22, 2008, now Pat. No. 7,942,545.

(51) Int. Cl.
*F21V 7/00*    (2006.01)

(52) U.S. Cl. ......... 362/217.05; 362/217.07; 362/217.16; 362/217.12; 362/297

(58) Field of Classification Search .......... 362/217.05–217.09, 217.1–217.17, 362/296.01, 297, 296.07, 347, 348, 433
See application file for complete search history.

(56) References Cited

U.S. PATENT DOCUMENTS

| | | | |
|---|---|---|---|
| 2,360,448 A | 6/1943 | Shockett | |
| 4,599,684 A * | 7/1986 | Lee | 362/217.05 |
| 4,799,134 A | 1/1989 | Pinch | |
| 4,814,954 A * | 3/1989 | Spitz | 362/217.07 |
| 4,974,131 A | 11/1990 | Paradiso | |
| 5,207,504 A | 5/1993 | Swift | |
| 5,412,551 A * | 5/1995 | Newell | 362/217.05 |
| 5,414,604 A * | 5/1995 | Anderson | 362/217.07 |
| 5,473,522 A | 12/1995 | Kriz | |
| 5,757,112 A * | 5/1998 | Van Dulmen | 362/217.07 |
| 6,210,019 B1 | 4/2001 | Weathers | |
| 6,523,975 B1 * | 2/2003 | Plourde et al. | 362/217.07 |
| 6,984,131 B2 | 1/2006 | Shah | |
| 2001/0050850 A1 | 12/2001 | Plunk | |
| 2002/0136001 A1 | 9/2002 | Lefkovitz | |

FOREIGN PATENT DOCUMENTS

| | | |
|---|---|---|
| GB | 744252 | 2/1956 |
| GB | 820976 | 9/1959 |
| GB | 1424206 | 2/1976 |
| GB | 2172390 A | 9/1986 |
| GB | 2188139 A | 9/1987 |
| WO | WO00/42820 A2 | 7/2000 |

* cited by examiner

*Primary Examiner* — Bao Q Truong
(74) *Attorney, Agent, or Firm* — Alfred M. Walker (57) ABSTRACT

A retrofit kit is configured for a single or multiple tubular fluorescent lamp fixture. The original fixture being retrofitted may or may not have any reflectors. The kit includes a new improved reflector with double concave wings. The winged reflector preferably has a central arched, preferably trapezoidal portion which forms the lower cover of the fixture box. This central trapezoidal portion includes an access door to permit access to the ballast without the need to remove the winged reflector once it is installed. An arched, preferably trapezoidal socket bar is installed at each end of the fixture, to lower the position of the lamp with respect to the winged reflector surfaces, to enhance the light distribution in a downward direction while permitting enhanced up-lighting. The distal ends of the trapezoidal central portion of the reflector mate with the trapezoidal socket bars at opposite ends of the fixture.

25 Claims, 8 Drawing Sheets

LUMINAIRE: FORMED STEEL HOUSING, FORMED WHITE ENAMEL, ALUMINUM REFLECTOR, NO ENCLOSURE.
LAMP: ONE 32 WATT T8 LINEAR FLUORESCENT LAMP RATED AT 3100 LUMENS
BALLAST: ONE GE GE-132-MAX-N/ULTRA
MOUNTING: PENDANT
  LUMEN TO CANDELA RATIO USED = 9.18
  TOTAL INPUT WATTS = 28.4 AT 120.0 VOLTS
  THE 0 DEGREE PLANE IS PARALLEL WITH THE LAMPS

CANDELA DISTRIBUTION

| | 0.0 | 22.5 | 45.0 | 67.5 | 90.0 | FLUX |
|---|---|---|---|---|---|---|
| 0 | 683 | 683 | 683 | 683 | 683 | |
| 5 | 680 | 680 | 682 | 679 | 679 | 65 |
| 15 | 657 | 657 | 667 | 675 | 680 | 189 |
| 25 | 613 | 620 | 560 | 666 | 673 | 298 |
| 35 | 549 | 569 | 611 | 650 | 666 | 382 |
| 45 | 466 | 502 | 571 | 620 | 639 | 434 |
| 55 | 369 | 422 | 512 | 570 | 591 | 444 |
| 65 | 259 | 343 | 430 | 504 | 533 | 414 |
| 75 | 138 | 233 | 345 | 412 | 434 | 336 |
| 85 | 26 | 135 | 213 | 236 | 247 | 192 |
| 90 | 2 | 48 | 66 | 78 | 84 | |
| 95 | 0 | 21 | 13 | 2 | 1 | 13 |
| 105 | 0 | 7 | 7 | 2 | 0 | 4 |
| 115 | 0 | 2 | 2 | 0 | 0 | 1 |
| 125 | 0 | 0 | 0 | 0 | 0 | 0 |
| 135 | 0 | 0 | 0 | 0 | 0 | 0 |
| 145 | 0 | 0 | 0 | 0 | 0 | 0 |
| 155 | 0 | 0 | 0 | 0 | 0 | 0 |
| 165 | 0 | 0 | 0 | 0 | 0 | 0 |
| 175 | 0 | 0 | 0 | 0 | 0 | 0 |
| 180 | 0 | 0 | 0 | 0 | 0 | |

ZONAL LUMEN SUMMARY

| ZONE | LUMENS | %LAMP | %FIXT |
|---|---|---|---|
| 0- 30 | 551 | 18.14 | 19.9 |
| 0- 40 | 934 | 31.1 | 33.7 |
| 0- 60 | 1812 | 60.4 | 65.3 |
| 0- 90 | 2754 | 91.8 | 99.3 |
| 90-120 | 19 | 0.6 | 0.7 |
| 90-130 | 19 | 0.6 | 0.7 |
| 90-150 | 19 | 0.6 | 0.7 |
| 90-180 | 19 | 0.6 | 0.7 |
| 0-180 | 2773 | 92.4 | 100.0 |

TOTAL LUMINAIRE EFFICIENCY:   92.4%
TOTAL REFLECTANCE OF PAINT:   92.2%
CIE TYPE:          DIRECT
PLANE:             0-DEG    90-DEG
SPACING CRITERIA:  1.3      1.5

*Fig. 6*

| CANDELA DISTRIBUTION | | | | | | ZONAL LUMEN SUMMARY | | |
|---|---|---|---|---|---|---|---|---|
| | 0.0 | 22.5 | 45.0 | 67.5 | 90.0 | 0- | 5 | 16. |
| 0 | 683 | 683 | 683 | 683 | 683 | 5- | 10 | 48. |
| 5 | 680 | 680 | 682 | 679 | 679 | 10- | 15 | 80. |
| 10 | 671 | 670 | 675 | 675 | 677 | 15- | 20 | 109. |
| 15 | 657 | 657 | 667 | 675 | 680 | 20- | 25 | 137. |
| 20 | 638 | 640 | 660 | 674 | 680 | 25- | 30 | 161. |
| 25 | 613 | 620 | 650 | 666 | 673 | 30- | 35 | 182. |
| 30 | 584 | 596 | 633 | 656 | 668 | 35- | 40 | 200. |
| 35 | 549 | 569 | 611 | 650 | 666 | 40- | 45 | 213. |
| 40 | 509 | 538 | 591 | 639 | 655 | 45- | 50 | 221. |
| 45 | 466 | 502 | 571 | 620 | 639 | 50- | 55 | 224. |
| 50 | 420 | 462 | 544 | 598 | 620 | 55- | 60 | 221. |
| 55 | 369 | 422 | 512 | 570 | 591 | 60- | 65 | 214. |
| 60 | 316 | 387 | 476 | 535 | 561 | 65- | 70 | 201. |
| 65 | 259 | 343 | 430 | 504 | 533 | 70- | 75 | 182. |
| 70 | 200 | 291 | 389 | 465 | 492 | 75- | 80 | 154. |
| 75 | 138 | 233 | 345 | 412 | 434 | 80- | 85 | 126. |
| 80 | 78 | 184 | 284 | 348 | 376 | 85- | 90 | 66. |
| 85 | 26 | 135 | 213 | 236 | 247 | 90- | 95 | 9. |
| 90 | 2 | 48 | 66 | 78 | 84 | 95- | 100 | 4. |
| 95 | 0 | 21 | 13 | 2 | 1 | 100- | 105 | 3. |
| 100 | 0 | 13 | 10 | 2 | 0 | 105- | 110 | 2. |
| 105 | 0 | 7 | 7 | 2 | 0 | 110- | 115 | 1. |
| 110 | 0 | 4 | 4 | 1 | 0 | 115- | 120 | 0. |
| 115 | 0 | 2 | 2 | 0 | 0 | 120- | 125 | 0. |
| 120 | 0 | 1 | 2 | 0 | 0 | 125- | 130 | 0. |
| 125 | 0 | 0 | 0 | 0 | 0 | 130- | 135 | 0. |
| 130 | 0 | 0 | 0 | 0 | 0 | 135- | 140 | 0. |
| 135 | 0 | 0 | 0 | 0 | 0 | 140- | 145 | 0. |
| 140 | 0 | 0 | 0 | 0 | 0 | 145- | 150 | 0. |
| 145 | 0 | 0 | 0 | 0 | 0 | 150- | 155 | 0. |
| 150 | 0 | 0 | 0 | 0 | 0 | 155- | 160 | 0. |
| 155 | 0 | 0 | 0 | 0 | 0 | 160- | 165 | 0. |
| 160 | 0 | 0 | 0 | 0 | 0 | 165- | 170 | 0. |
| 165 | 0 | 0 | 0 | 0 | 0 | 170- | 175 | 0. |
| 170 | 0 | 0 | 0 | 0 | 0 | 175- | 180 | 0. |
| 175 | 0 | 0 | 0 | 0 | 0 | | | |
| 180 | 0 | 0 | 0 | 0 | 0 | | | |

*Fig. 7*

COEFFICIENTS OF UTILIZATION - ZONAL CAVITY METHOD
EFFECTIVE FLOOR CAVITY REFLECTANCE 0.20

| RC | 80 | | | | | 70 | | | | | 50 | | | 30 | | | 10 | | | 0 |
|---|---|---|---|---|---|---|---|---|---|---|---|---|---|---|---|---|---|---|---|---|
| RW | 70 | 50 | 30 | 10 | | 70 | 50 | 30 | 10 | | 50 | 30 | 10 | 50 | 30 | 10 | 50 | 30 | 10 | 0 |
| 0 | 110 | 110 | 110 | 110 | | 107 | 107 | 107 | 107 | | 102 | 102 | 102 | 98 | 98 | 98 | 94 | 94 | 94 | 92 |
| 1 | 98 | 93 | 88 | 84 | | 96 | 91 | 86 | 82 | | 87 | 83 | 80 | 83 | 80 | 77 | 79 | 77 | 75 | 73 |
| 2 | 88 | 79 | 72 | 66 | | 86 | 78 | 71 | 65 | | 74 | 68 | 64 | 71 | 66 | 62 | 68 | 64 | 60 | 58 |
| 3 | 80 | 69 | 61 | 54 | | 78 | 68 | 60 | 54 | | 65 | 58 | 52 | 62 | 56 | 51 | 59 | 55 | 50 | 48 |
| 4 | 73 | 61 | 52 | 45 | | 71 | 59 | 51 | 45 | | 57 | 50 | 44 | 55 | 48 | 43 | 52 | 47 | 43 | 40 |
| 5 | 66 | 53 | 44 | 37 | | 64 | 52 | 43 | 37 | | 50 | 42 | 36 | 48 | 41 | 36 | 46 | 40 | 35 | 33 |
| 6 | 60 | 47 | 38 | 32 | | 59 | 46 | 38 | 31 | | 44 | 37 | 31 | 43 | 36 | 31 | 41 | 35 | 30 | 28 |
| 7 | 56 | 42 | 33 | 27 | | 54 | 41 | 33 | 27 | | 40 | 32 | 27 | 38 | 31 | 26 | 37 | 31 | 26 | 24 |
| 8 | 51 | 38 | 29 | 23 | | 50 | 37 | 29 | 23 | | 36 | 28 | 23 | 34 | 28 | 23 | 33 | 27 | 22 | 21 |
| 9 | 47 | 34 | 25 | 20 | | 46 | 33 | 25 | 20 | | 32 | 25 | 20 | 31 | 24 | 19 | 30 | 24 | 19 | 17 |
| 10 | 44 | 31 | 23 | 17 | | 42 | 30 | 22 | 17 | | 29 | 22 | 17 | 28 | 22 | 17 | 27 | 21 | 17 | 15 |

| PLANE: | 0-DEG | 90-DEG |
|---|---|---|
| LUMINOUS LENGTH: | 48.000 | 10.000 |
| HEIGHT OF SIDE: | 2.125 | 0.625 |

LUMINANCE IN CANDELA PER SQUARE METER

| ANGLE IN DEG | AVERAGE 0-DEG | AVERAGE 45-DEG | AVERAGE 90-DEG |
|---|---|---|---|
| 0 | 8401. | 3504. | 3497. |
| 45 | 7365. | 3758. | 4208. |
| 55 | 6897. | 3995. | 4620. |
| 65 | 6154. | 4280. | 5323. |
| 75 | 4700. | 4950. | 6264. |
| 85 | 1656. | 2793. | 6800. |

Fig. 8

FLUORESCENT LIGHT FIXTURE RETROFIT KIT

RELATED APPLICATIONS

This application is a continuation-in-part of application Ser. No. 12/229,390 filed on Aug. 22, 2008 now U.S. Pat. No. 7,942,545 entitled BALLAST ACCESS HATCH IN REFLECTOR, and claims priority under 35 U.S.C. §120 in part therefrom.

FIELD OF THE INVENTION

The present invention relates to a retrofit kit for tubular fluorescent lamp fixtures.

BACKGROUND OF THE INVENTION

Although the prior art reveals a variety of retrofit kits for fluorescent fixtures, none provide the combination of high efficiency, even light distribution, low cost, and ease of installation of the present invention.

OBJECTS OF THE INVENTION

It is an object of the present invention to provide an easily installable a retrofit kit for tubular fluorescent lamp fixtures.

It is an object of the present invention to provide an easily maintainable and accessible retrofit kit for tubular fluorescent lamp fixtures.

It is also an object of the present invention to provide a new improved reflector with enhanced illumination.

It is an object of the present invention to provide an easily installable a retrofit kit for tubular fluorescent lamp fixtures.

It is yet another object to maximize the position of the lamp or lamps below the reflector for maximum illumination with both downward light and uplight capabilities.

It is also an object of the present invention to improve over the disadvantages of the prior art.

SUMMARY OF THE INVENTION

In keeping with these objects and others which may become apparent, the present invention relates to the use of a retrofit kit which is designed to delamp fixtures using two T12 lamps to a single T8 lamp. It can also be used to delamp from two T8's to a single T8 due to the high efficiency and other improvements offered by kit. Similar 4-lamp to 2-lamp retrofit kits are feasible although they will not be detailed in this invention.

A key component of the retrofit kit is an arched (preferably trapezoidal) socket bar which is used at both ends of the fixture housing. It secures the lamp socket as well as providing a rigid anchor point at each end of the fixture for a concave reflector, preferably a two wing reflector, which is carefully formed to enhance both efficiency as well as uniformity of light distribution. This arched socket bar has bent tabs which snap into socket bar slots at the sides of the housing by entering from the outside of the vertical sides. To further enhance the attachment, sheet metal screws can be used through holes in the vertical sides of the socket bar into the housing sides. A major purpose of the arched socket bar, besides the structural aspects, is the precise placement of the fluorescent lamp relative to the concave wing surfaces of the reflector. This is a key element of achieving the desired light distribution. The arched socket bar also contributes to the ease of installation of this retrofit kit.

The reflector is formed to provide a narrow horizontal central section and two sloped adjacent sections which contribute to its rigidity even if formed of relatively thin sheet metal. Since the high efficiency replacement ballast is not supported by the reflector, but attached inside the housing, this also lessens the required structural integrity. The light weight, while reducing cost, also contributes to ease of installation; it is secured to the arched socket bar by a single quarter-turn screw at each end. The sloped central sections on either side of the central horizontal section are extended by several linear facets bent at precise angles forming the generally concave wings. A highly reflective white enamel paint is used in lieu of a specular coating. This reduces cost while supporting over a 90% overall efficiency. By design, approximately 6% uplighting is achieved by this design. A three page luminaire test report is included in the drawing section to support these contentions.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
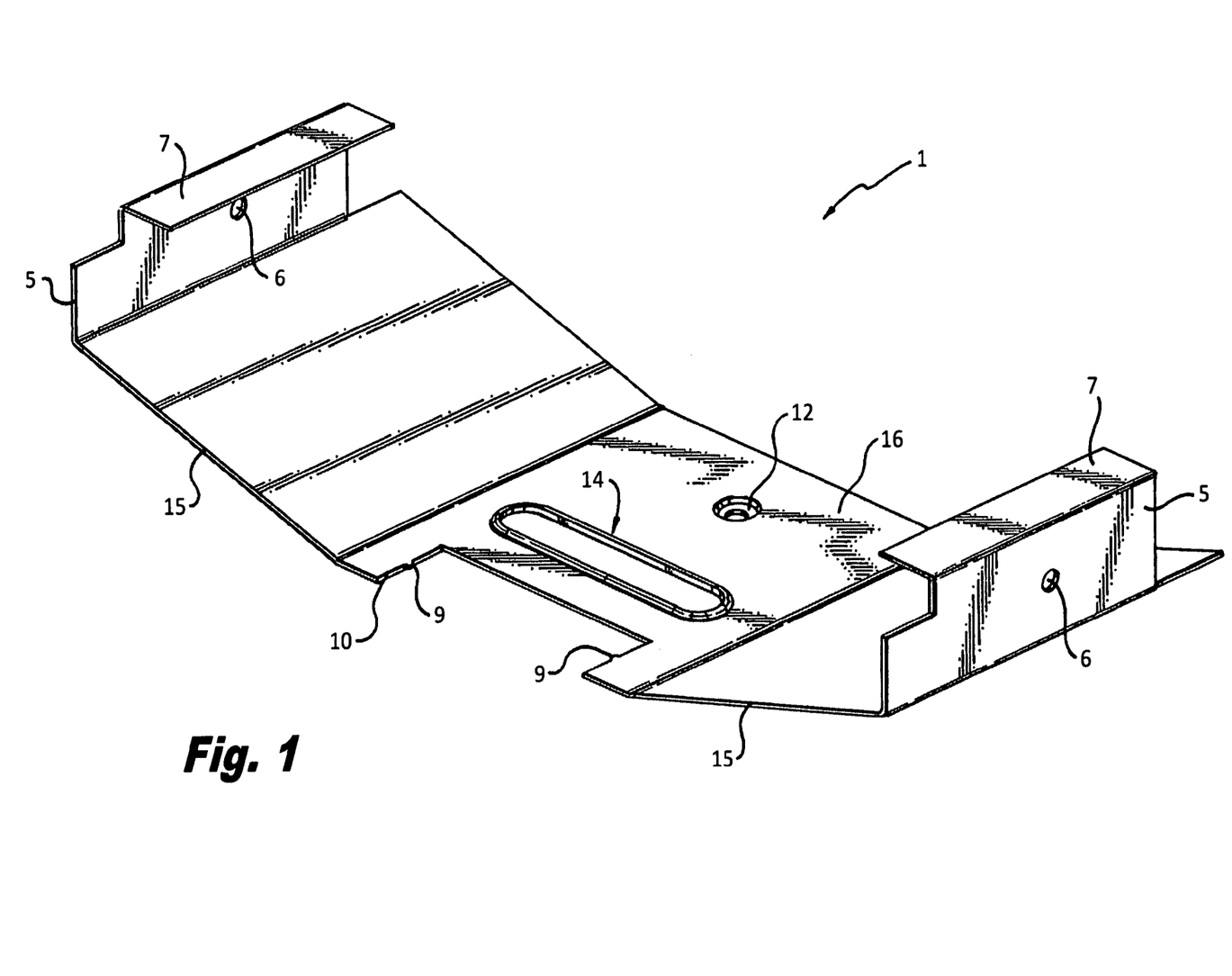
FIG. 1 is a perspective view of the arched socket bar used at each end of the housing of this retrofit kit.
Figure 2A:
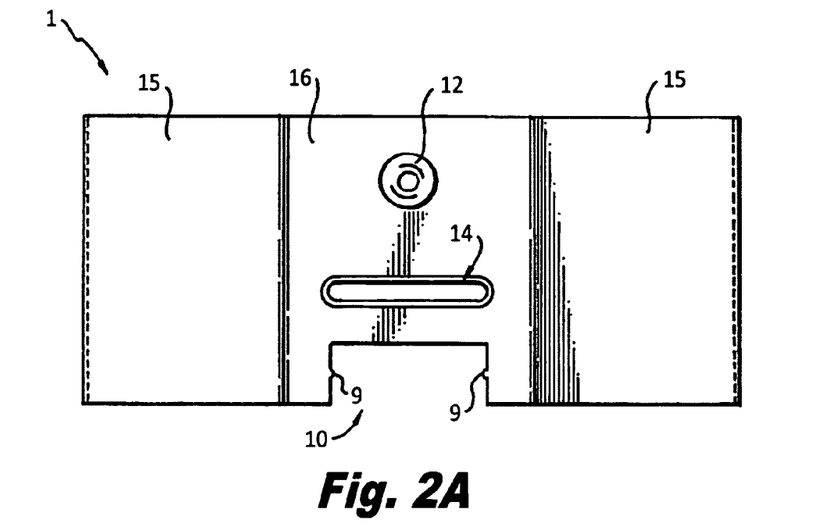
FIG. 2 shows three orthographic views of the arched socket bar of FIG. 1 (note these views are inverted with respect to FIG. 1).
Figure 2B:
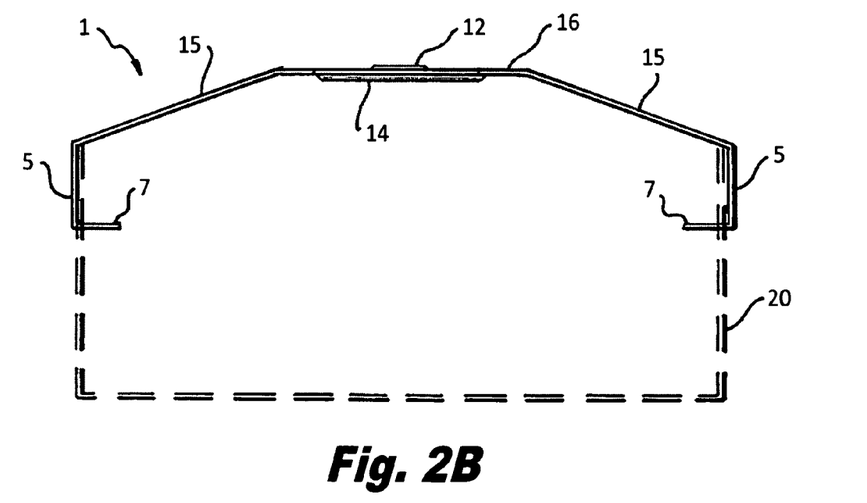
Figure 2C:
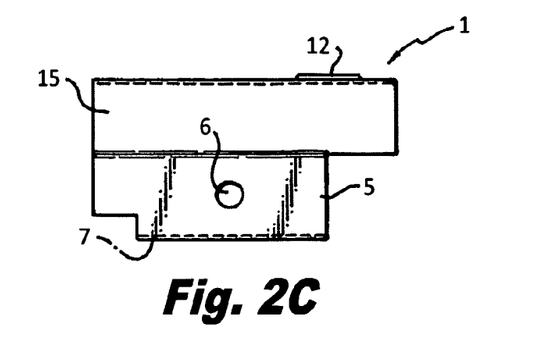

FIGS. 1 and 2 describe the shape of the arched (trapezoidal) socket bar 1 used at each end of the fixture housing. It is a key structural element as well as a performance element which precisely fixes the location of the lamp socket in relation to the reflector. As a die formed sheet metal part, it is inexpensive to produce. It has sloping sides 15 on either side of horizontal section 16. Vertical walls 5 hug the outside vertical surfaces of the housing while tabs 7 engage the socket bar slots on the sides of the housing. Holes 6 can be used to add attachment screws from socket bar 1 to the housing. A cutout region with side edges 9 used as rails to engage the lamp socket (a type which mounts by side grooves) is part of the horizontal section. Dimples 10 are used to engage the side grooves of the lamp socket for a tight fit. An elongated hole 14 with rounded edges is used as a stiffening feature. Item 12 is an embossed section with a punched slotted hole to accommodate a ¼-turn screw used to support one end of the reflector.

Figure 3A:
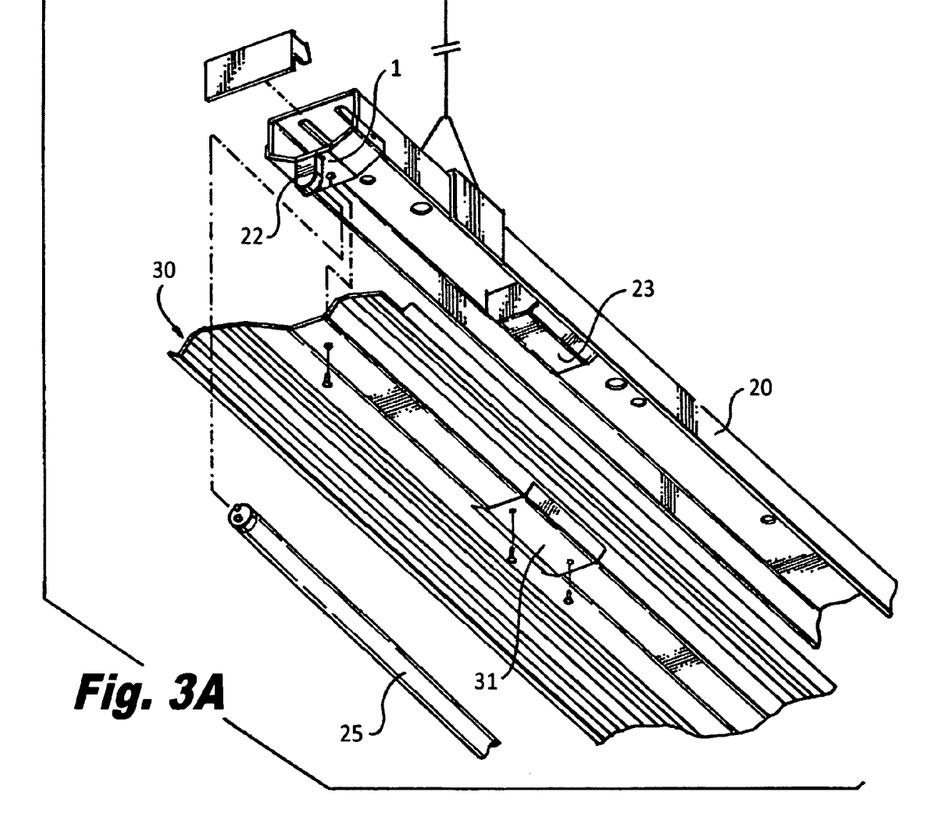
FIG. 3A is a retrofit kit instruction sheet with parts.
Figure 3B:
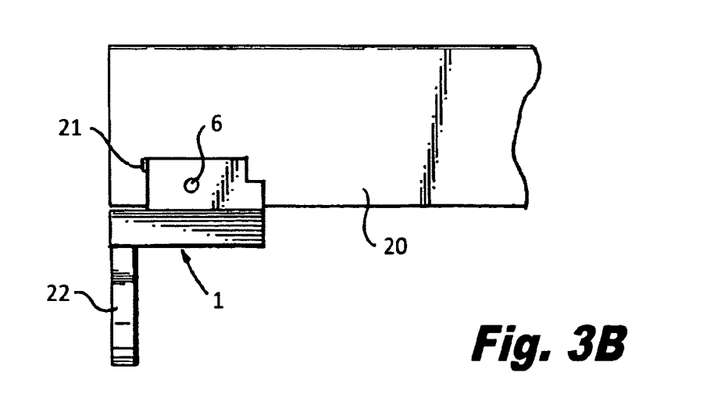
FIG. 3B is a detailed view of a socket bar, socket bar slot and lamp socket of the retrofit kit of FIG. 3A.

FIGS. 3A and 3B detail the six simple steps required for installation. The socket bar 1, socket bar slot 21 and lamp socket 22 are shown in a detail in FIG. 3B, whereby the socket bar is inserted into an outside surface slot of the housing 20, with the socket 22 for the lamp 25 descending downward therefrom. FIG. 3A shows housing 20, ballast 23, reflector 30, lamp 25 and ballast cover 31 in addition to other parts already discussed.

Installation includes the following steps:

1) insert the socket 22 into the socket track and secure the socket bar 1 around the outside the channel into existing socket bar slots of the housing 20;

2) install a new ballast 23 in channel wire as per the wiring schematic on the ballast 23;

3) install the winged reflectors 30, where the reflector 30 with a ballast opening is installed under the ballast location only with a ballast cover 31 in positional register with the ballast 23;

4) secure the reflector 30 with fasteners, such as screws;

5) secure the ballast cover 31 on an underside of the reflector 30 by appropriate use of fasteners; and, 6) insert lamps 25 into the sockets 22 and rotate the lamps 25 until properly locked into position.

Figure 4:
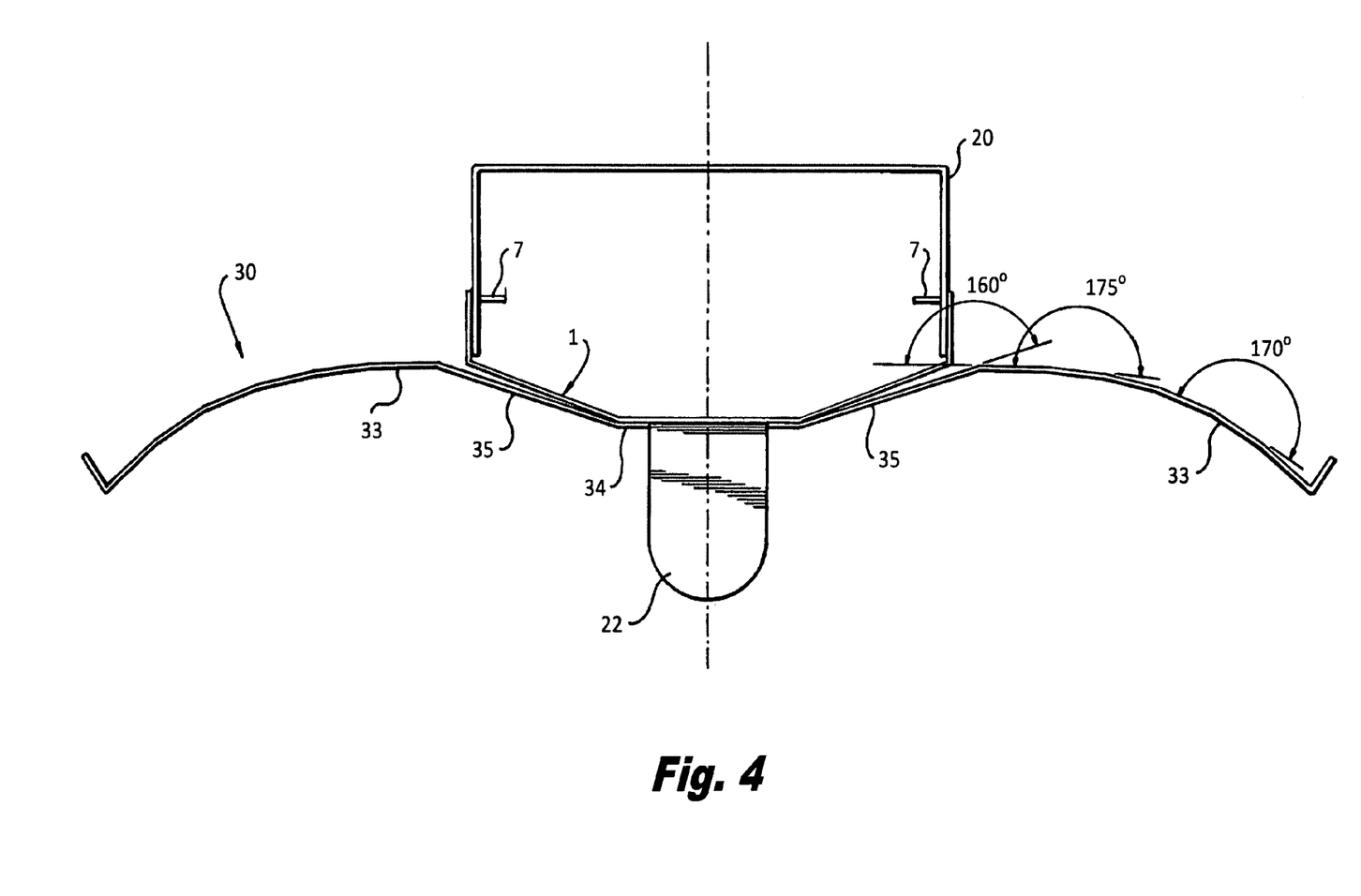
FIG. 4 an end view of a completed retrofit kit showing the reflector contour details as well as the geometric relations between socket bar, housing, and lamp socket.

FIG. 4 shows a detailed end view of double wing reflector 30 and its relation to arched socket bar 1, socket 22, and housing 20. Socket bar 1 wraps around a lower portion of housing 20 from underneath. Note tabs 7 fitting from the outside through the sides of housing 20. The relation of the position of socket 22 and the size and angle of each facet in concave sections 33 contribute to the superior efficiency and uniformity of light distribution of this retrofit kit fixture. While angles may vary, preferably each facet forming the concave reflector wing 33 extends at an angle downward from each adjacent facet, starting with the first fact closest to housing 20. For example, the first facet extends near a respective sloped lower portion of socket bar 1, which is at an angle of about 160 degrees off of an imaginary horizontal line where the sloped portion of socket bar 1 meets the vertical portion of socket bar 1. The next subsequent facet extends downward about 175 degrees off of the first facet. Subsequent facets, preferably about five facets, extend about 170 degrees off of the closest facet on the side of the subsequent facet nearest to the socket bar 1 and housing 20, ending in a distal end of winged reflector 33. Note that central horizontal section 34 and sloped adjacent sections 35 of reflector 30 form the bottom cover of housing 20. FIG. 4 also shows that the optimal position of the lamp within socket 22 is below the imaginary horizontal plane formed by the respective opposite distal ends of concave sections 33 of the winged reflector 30. Additionally, the distal ends of each respective concave winged position 33 of winged reflector 30 are bent upward at an angle. The lowered position of the lamp within socket 22 and the bent distal ends of the concave winged reflector also assist in providing uplight, as well as downward illumination of light reflected by the respective concave winged portions 33 of the winged reflector 30.

Figure 5:
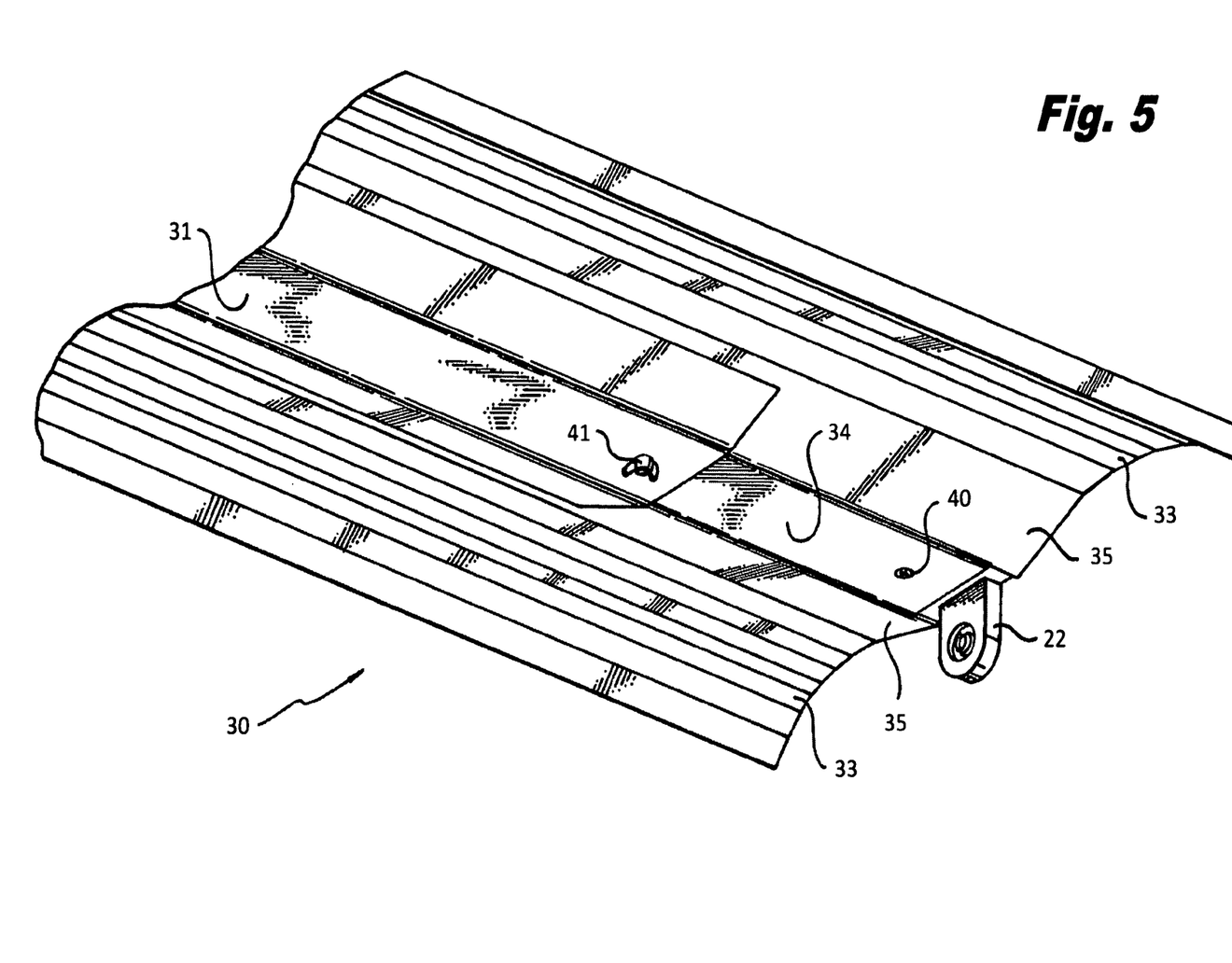
FIG. 5 is a perspective detail of one end of an installed retrofit kit showing the location of the ballast access cover (for clarity, the lamp is not shown in this view).

FIG. 5 shows a detail of the completed kit (minus lamp) showing the mounting screw 40 attaching reflector 30 to arched socket bar 1. Ballast cover 31 secured by ¼ turn wing screw 41 is also shown.

Figure 6:
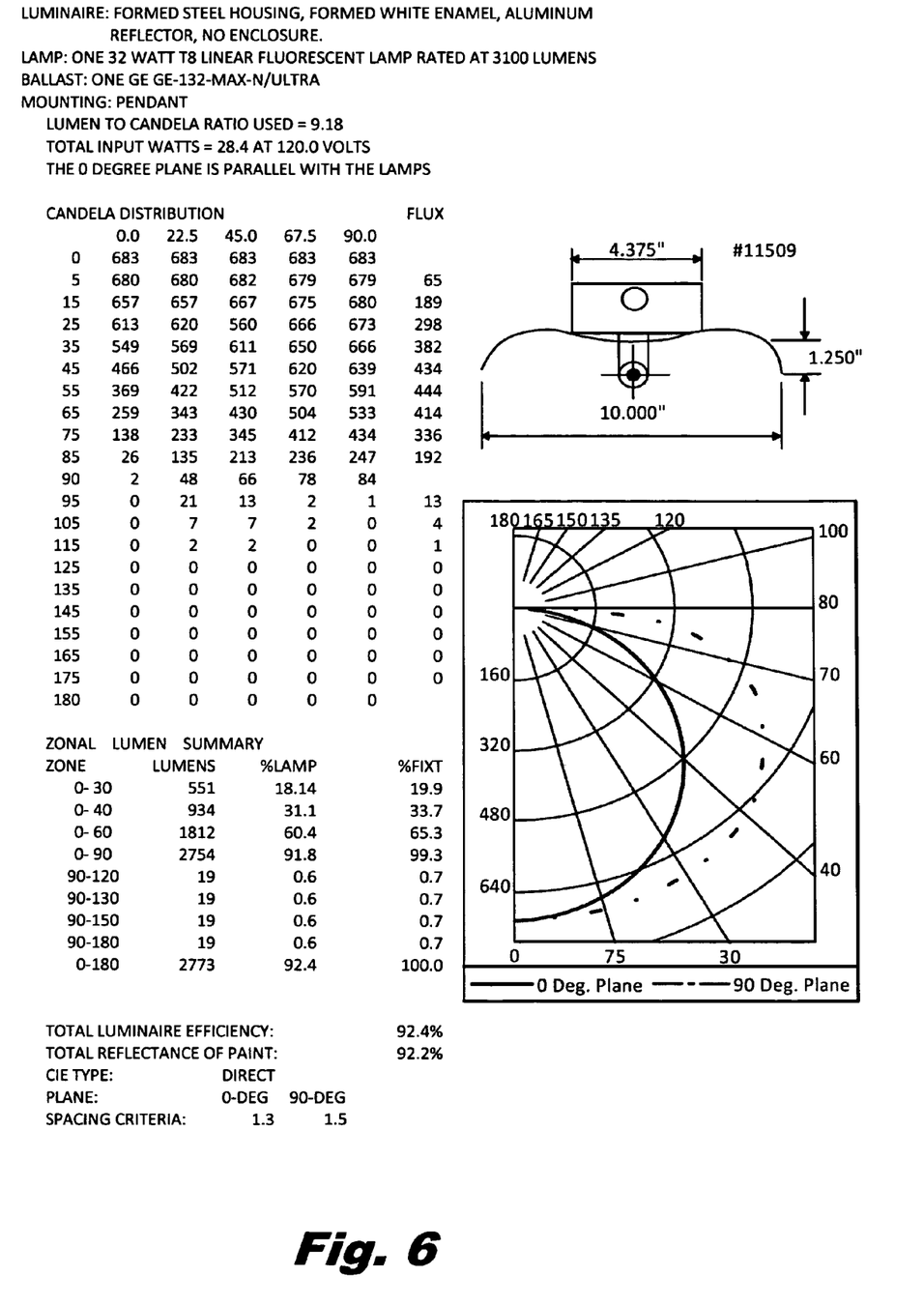
FIG. 6 is the test results on a first page of the luminaire test report showing, in part, a Polar Candela Plot.
Figure 7:
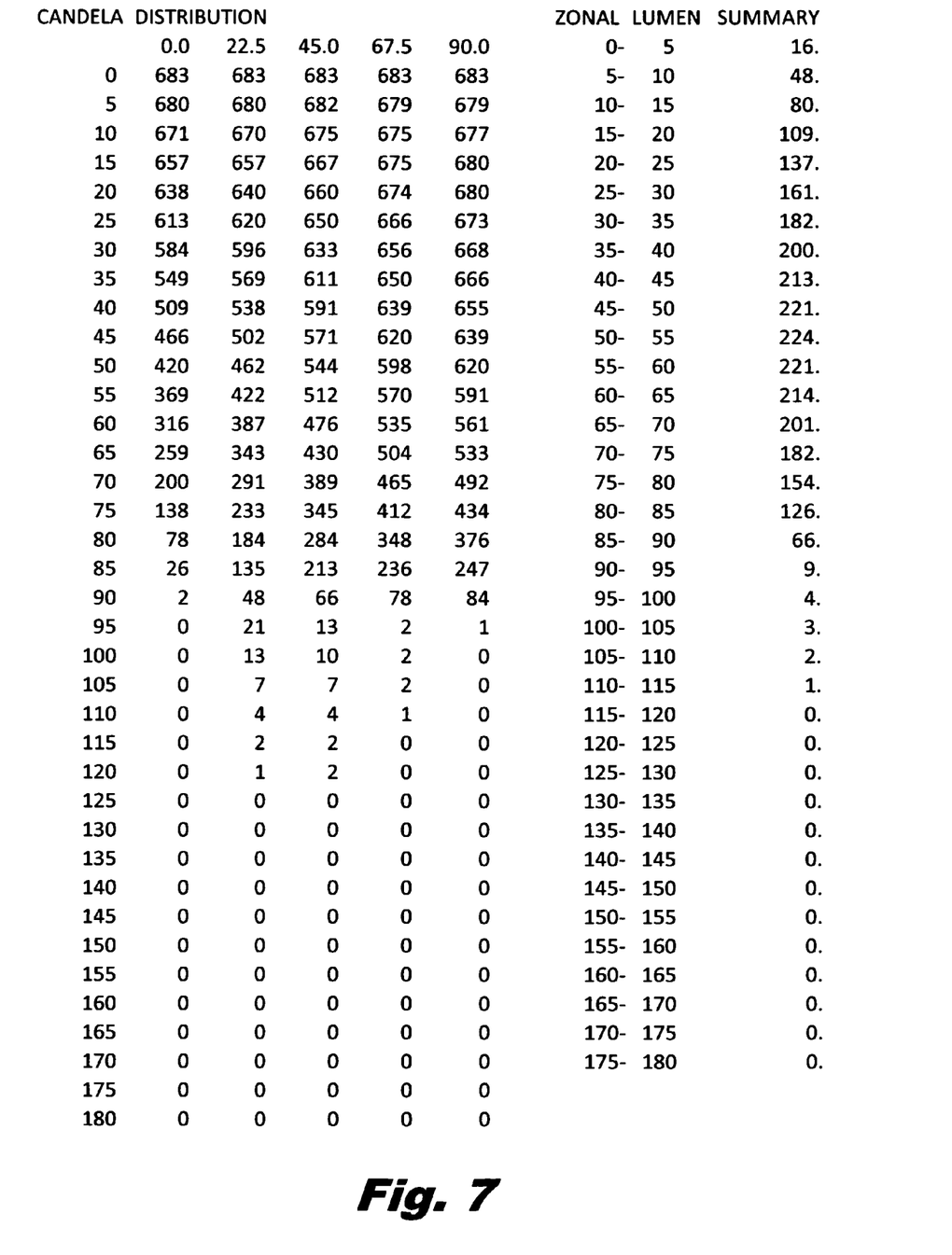
FIG. 7 is the test results on a second page of the luminaire test report with a Candela Distribution Table and a Zonal Lumen Summary at 5 degree increments.
Figure 8:
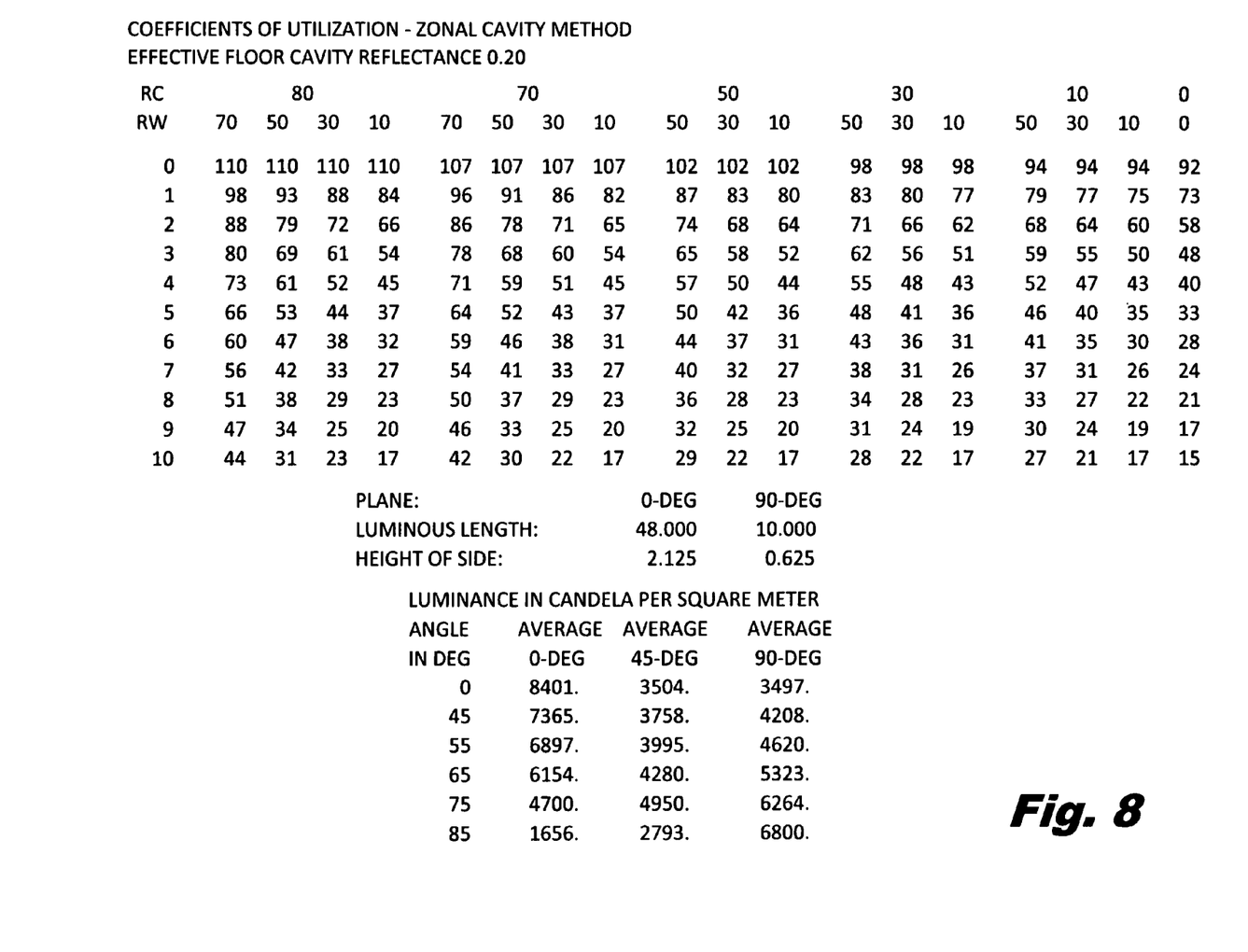
FIG. 8 is the test results on a third page of the luminaire test report showing Coefficients of Utilization for a variety of space configurations (zonal cavity method) and a variety of ceiling and wall reflectance values.

FIGS. 6-8 constitute a Luminaire Test Report conducted by Luminaire Testing Laboratory Inc of Allentown, Pa. on Applicants' behalf in standard format which is used to compare fixtures of various types using the same testing techniques.

In FIG. 6, the total reflectance of the reflector paint is shown as 92.2%; the total luminaire efficiency is shown as 92.4%. The smooth contours shown on the Polar Candela Plot attest to the uniformity of illumination provided by this retrofit kit.

The gradual drop-off's shown in both the candela as well as zonal lumen summaries of FIG. 7 tables reinforce the uniformity aspect. The test conducted on Applicants' behalf was conducted using relative photometry techniques according to standard procedures of the Illuminating Engineering Society of North America (IESNA).

The Coefficients of Utilization tables shown in FIG. 8 support the conjecture of uniform light distribution in "real world" environments since even in terrible "room cavity ratios" of 10 high scores are achieved.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A retrofit kit configured for a single or multiple tubular fluorescent lamp fixture housing comprising:
    a reflector having double concave wings on respective opposite sides of a central arched portion which forms a lower cover of a fixture box of the fixture;
    said central arched portion including an access door to permit access to a ballast without the need to remove the winged reflector once it is installed;
    a pair of arched socket bars, each respective socket bar being installed at each respective end of the fixture, to lower the position of the lamp with respect to respective winged reflector surfaces of said reflector having double concave wings, to enhance the light distribution in a downward direction while permitting enhanced up-lighting; and,
    wherein respective distal ends of said arched central portion of said winged reflector mate with said respective arched socket bars at said opposite ends of the fixture.

2. The retrofit kit for a lamp fixture as in claim 1 wherein said central arched portion is trapezoidal when viewed in crossection.

3. The retrofit kit for a lamp fixture as in claim 1 wherein each said arched socket bar is trapezoidal when viewed in crossection.

4. The retrofit kit for a lamp fixture as in claim 1 further comprising said arched socket bar having respective bent tabs which snap into respective socket bar slots at respective sides of the fixture housing by entering from an outside surface of respective vertical sides of the fixture housing.

5. The retrofit kit for a lamp fixture as in claim 1 wherein each respective fluorescent lamp is positioned below respective surfaces of said concave wings of said reflector.

6. The retrofit kit for a lamp fixture as in claim 1 wherein said winged reflector includes a narrow horizontal central section and two sloped adjacent sections contributing to rigidity of said winged reflector.

7. The retrofit kit for a lamp fixture as in claim 6 wherein said winged reflector is formed of sheet metal.

8. The retrofit kit for a lamp fixture as in claim 1 wherein a ballast of said lamp fixture is not supported by the reflector, and is attached inside the fixture housing, thereby lessening the required structural integrity.

9. The retrofit kit for a lamp fixture as in claim 6 wherein said sloped sections of said winged reflector are provided on either side of said central horizontal section and are extended by a plurality of linear facets bent at predetermined angles forming said concave wings.

10. The retrofit kit for a lamp fixture as in claim 1 wherein said winged reflector is coated with a reflective white paint.

11. The retrofit kit for a lamp fixture as in claim 1 wherein the lamp within said socket is positioned below an imaginary horizontal plane formed by the respective distal ends of said concave portions of said winged reflector, whereby said lowered position of the lamp within said socket assists in providing uplight, as well as downward illumination of light from the lamp reflected by said respective concave winged portions of said winged reflector.

12. The retrofit kit for a lamp fixture as in claim 11 wherein said respective distal ends of each respective concave winged position of said winged reflector are bent upward at an angle.

13. A retrofit kit configured for a single or multiple tubular fluorescent lamp fixture housing comprising:
   a reflector having double concave wings on respective opposite sides of a central arched portion which forms a lower cover of a fixture box of the fixture;
   a pair of arched socket bars, each respective socket bar being installed at each respective end of the fixture, to lower the position of the lamp with respect to respective winged reflector surfaces of said reflector having double concave wings, to enhance the light distribution in a downward direction while permitting enhanced up-lighting; and,
   wherein respective distal ends of said arched central portion of said winged reflector mate with said respective arched socket bars at said opposite ends of the fixture.

14. The retrofit kit for a lamp fixture as in claim 13 wherein said central arched portion is trapezoidal when viewed in crossection.

15. The retrofit kit for a lamp fixture as in claim 13 wherein each said arched socket bar is trapezoidal when viewed in crossection.

16. The retrofit kit for a lamp fixture as in claim 13 further comprising said arched socket bar having respective bent tabs which snap into respective socket bar slots at respective sides of the fixture housing by entering from an outside surface of respective vertical sides of the fixture housing.

17. The retrofit kit for a lamp fixture as in claim 13 wherein each respective fluorescent lamp is positioned below respective surfaces of said concave wings of said reflector.

18. The retrofit kit for a lamp fixture as in claim 13 wherein said winged reflector includes a narrow horizontal central section and two sloped adjacent sections contributing to rigidity of said winged reflector.

19. The retrofit kit for a lamp fixture as in claim 18 wherein said winged reflector is formed of sheet metal.

20. The retrofit kit for a lamp fixture as in claim 13 wherein a ballast of said lamp fixture is not supported by the reflector, and is attached inside the fixture housing, thereby lessening the required structural integrity.

21. The retrofit kit for a lamp fixture as in claim 18 wherein said sloped sections of said winged reflector are provided on either side of said central horizontal section and are extended by a plurality of linear facets bent at predetermined angles forming said concave wings.

22. The retrofit kit for a lamp fixture as in claim 13 wherein said winged reflector is coated with a reflective white paint.

23. The retrofit kit for a lamp fixture as in claim 13 wherein the lamp within said socket is positioned below an imaginary horizontal plane formed by the respective distal ends of said concave portions of said winged reflector, whereby said lowered position of the lamp within said socket assists in providing uplight, as well as downward illumination of light from the lamp reflected by said respective concave winged portions of said winged reflector.

24. The retrofit kit for a lamp fixture as in claim 23 wherein said respective distal ends of each respective concave winged position of said winged reflector are bent upward at an angle.

25. The retrofit kit for a lamp fixture as in claim 13 wherein said central arched portion including an access door to permit access to a ballast without the need to remove the winged reflector once it is installed.

* * * * *